US007064269B2

(12) United States Patent
Smith

(10) Patent No.: US 7,064,269 B2
(45) Date of Patent: Jun. 20, 2006

(54) QUICK CONNECT ELECTRICAL JUNCTION BOX ASSEMBLY

(76) Inventor: David W. Smith, 12625 Coursey Blvd., Apt. 1055, Baton Rouge, LA (US) 70816

( * ) Notice: Subject to any disclaimer, the term of this patent is extended or adjusted under 35 U.S.C. 154(b) by 0 days.

(21) Appl. No.: 10/995,580

(22) Filed: Nov. 23, 2004

(65) Prior Publication Data

US 2006/0108137 A1 May 25, 2006

(51) Int. Cl.
*H02G 3/08* (2006.01)

(52) U.S. Cl. ............................ 174/50; 174/48; 174/50; 439/313

(58) Field of Classification Search .................. 174/50, 174/58, 60, 63, 135, 17 R, 48; 220/3.2, 3.3, 220/3.6, 4.02, 3.8; 248/906; 439/535, 313, 439/892

See application file for complete search history.

(56) References Cited

U.S. PATENT DOCUMENTS

| | | | | |
|---|---|---|---|---|
| 2,446,736 | A | 8/1948 | Biller | |
| 2,968,784 | A | 1/1961 | Mason | |
| 3,798,584 | A | 3/1974 | Person | |
| 3,885,147 | A | 5/1975 | Chacon | |
| 4,929,187 | A | 5/1990 | Hudson et al. | |
| 5,845,886 | A | 12/1998 | McCormick | |
| 6,325,654 | B1 | 12/2001 | Kerr, Jr. et al. | |
| 6,464,524 | B1 | 10/2002 | Kerr, Jr. et al. | |
| 6,503,099 | B1 | 1/2003 | Kerr, Jr. | |
| 6,616,112 | B1 | 9/2003 | Tseng | |
| 6,634,901 | B1 | 10/2003 | Kerr, Jr. | |
| 6,653,560 | B1 * | 11/2003 | Wu | 174/50 |
| 6,734,356 | B1 * | 5/2004 | Gretz | 174/58 |
| 6,774,304 | B1 * | 8/2004 | Gretz | 174/50 |
| 6,800,806 | B1 * | 10/2004 | Grday | 174/50 |
| 6,897,379 | B1 * | 5/2005 | Hsiao | 174/53 |
| 2002/0149269 | A1 | 10/2002 | Marihugh | |

* cited by examiner

*Primary Examiner*—Dhiru R. Patel
(74) *Attorney, Agent, or Firm*—Roy, Kiesel, et al

(57) ABSTRACT

A quick connect electrical junction box assembly for receipt and support of electrical appliances including a first support member adapted to be attached to a building, the first support member having a female electrical receptacle connected thereto, a second support member to support an electrical appliance, the second support member having a male electrical plug rotatably connected thereto, the male electrical plug being adapted to be received in the female electrical receptacle to make an electrical connection between first support member and the second support member, the second support member having at least one load bearing connector, the load bearing connector being adapted to be received in the first support member to connect the second support member to the first support member, the load bearing connector being spaced apart from the male electrical plug.

12 Claims, 4 Drawing Sheets

QUICK CONNECT ELECTRICAL JUNCTION BOX ASSEMBLY

BACKGROUND OF THE INVENTION

1. Field of the Invention

The present invention relates to electrical connectors. In particular, the present invention relates to electrical junction boxes which enable quick and easy connection of electrical appliances thereto.

2. Description of the Related Art

Installation of ceiling fans and ceiling lights in a home or other building is a difficult and time consuming procedure. Persons unskilled in connecting electrical wiring must hire expert electricians to install ceiling lights and ceiling fans properly. Furthermore, it may be desired to relocate the ceiling fan or ceiling light fixture as new furniture is added to a room, or if the furniture in a room is relocated or rearranged.

Wall lighting fixtures and other electrical wall appliances are also commonly installed in homes and other buildings, on both the inside of such buildings and on the outside of such buildings. Relocation or rearrangement of such electrical wall lighting fixtures or other appliances may also be desired, or installation of new electrical fixtures in new locations on the wall may be desired.

There is therefore a need for a quick connect electrical junction box which can be placed on a ceiling or wall that enables quick replacement or removal of an electrical appliance from the junction box. Provision of such a quick connect electrical junction box would enable the occupant of a building having such junction boxes to rearrange electrical appliances in the building as desired when new furniture is added to a room, or if the furniture in a room is relocated or rearranged.

Exemplary of the Patents of the related art are the following U.S. Pat. Nos.: 2,446,736; 2,968,784; 3,798,584; 3,885,147; 4,929,187; 5,845,886; 6,503,099; 6,616,112; and 6,634,901; and United States Patent Application Publication US 2002/0149269 A1.

BRIEF SUMMARY OF THE INVENTION

In accordance with the present invention there is provided a quick connect electrical junction box assembly for receipt and support of electrical appliances including a first support member adapted to be attached to a building, the first support member having a female electrical receptacle connected thereto and defining at least one load bearing surface having a slot therein, a second support member adapted to be attached to and support an electrical appliance and defining at least one load bearing surface, the second support member having a male electrical plug rotatably connected thereto, the male electrical plug being adapted to be received in the female electrical receptacle to make an electrical connection between the first support member and the second support member, the second support member having at least one load bearing connector projecting there from toward the first support member, the load bearing connector being adapted to be received in the slot in the load bearing surface in the first support member to connect the second support member to the first support member, the load bearing connector being spaced apart from the male electrical plug.

DETAILED DESCRIPTION OF THE INVENTION

Figure 1:
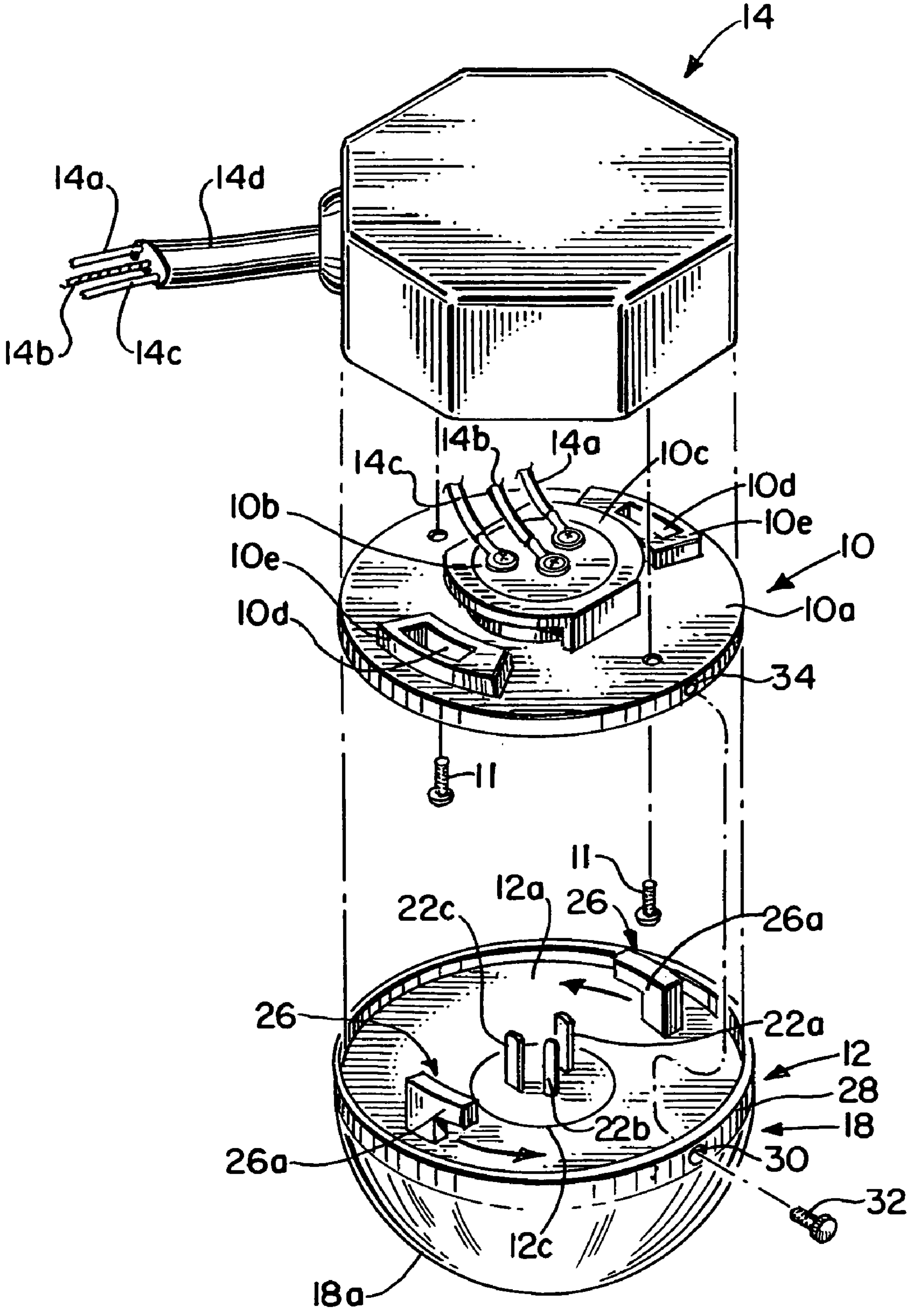
FIG. 1 is a perspective, exploded view of the invention having a light fixture connected thereto.

Referring now to the drawings, the quick connect junction box assembly of the invention can be seen to include a first support member generally indicated by the numeral 10 and a second support member generally indicated by the numeral 12.

Figure 6:
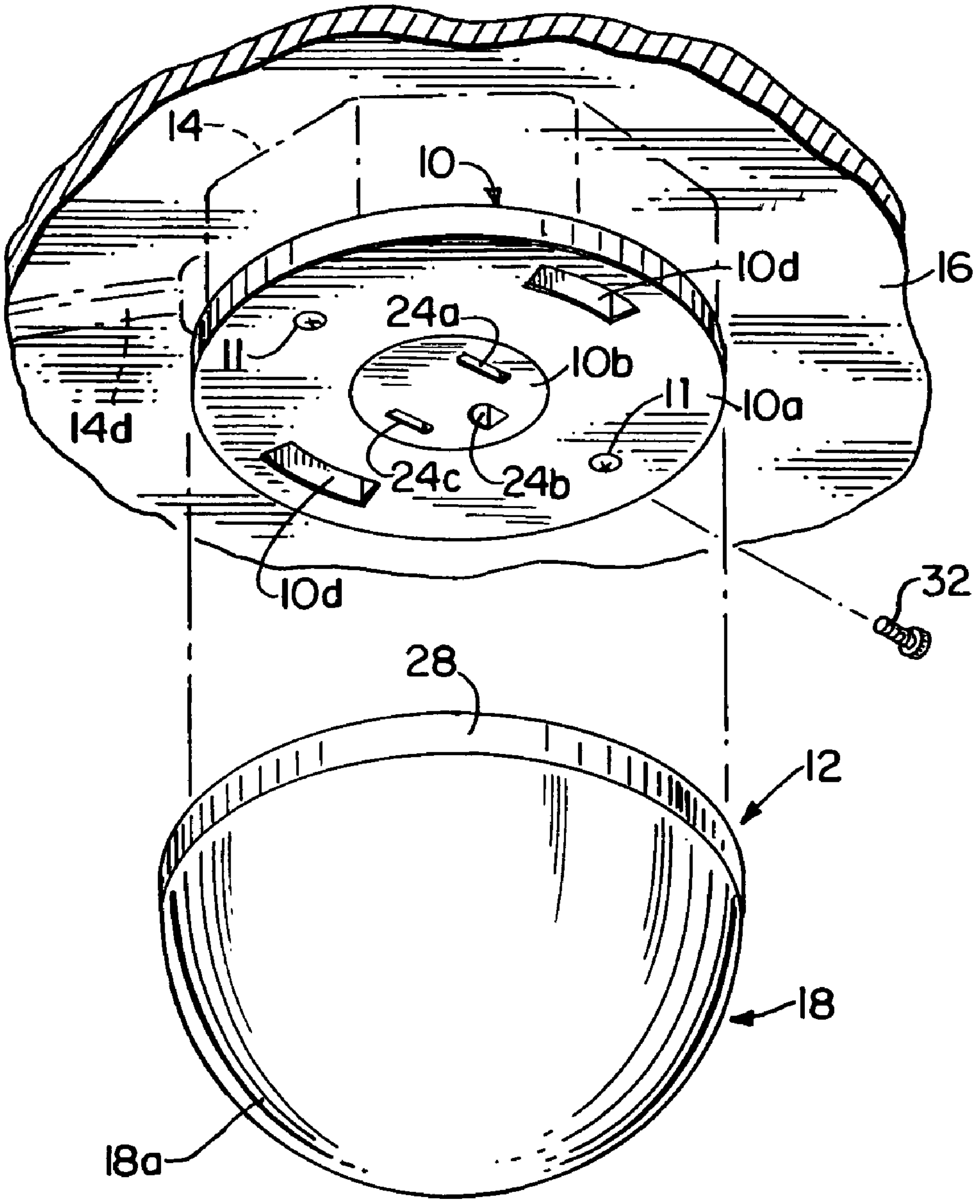
FIG. 6 is a perspective view of the bottom of the junction box of the invention.

First support member 10 is preferably connected to a conventional electrical junction box generally indicated by the numeral 14 by screw fasteners 11—11. As shown in FIG. 6, junction box 14 is connected to a wall or ceiling 16. As known in the art, junction box 14 could be connected directly to wall or ceiling 16 or to any of the structural members commonly used to support wall or ceiling 16, such as ceiling joists or wall studs. Junction box 14 has electrical conductors **14*a*, 14*b*, and 14*c* contained in cable 14*d* connected thereto for supplying electrical energy to electrical appliances that may be connected thereto. If desired, first support member 10 could be connected directly to ceiling joists, wall studs, or other structural members commonly used to support wall or ceiling 16**.

Figure 2:
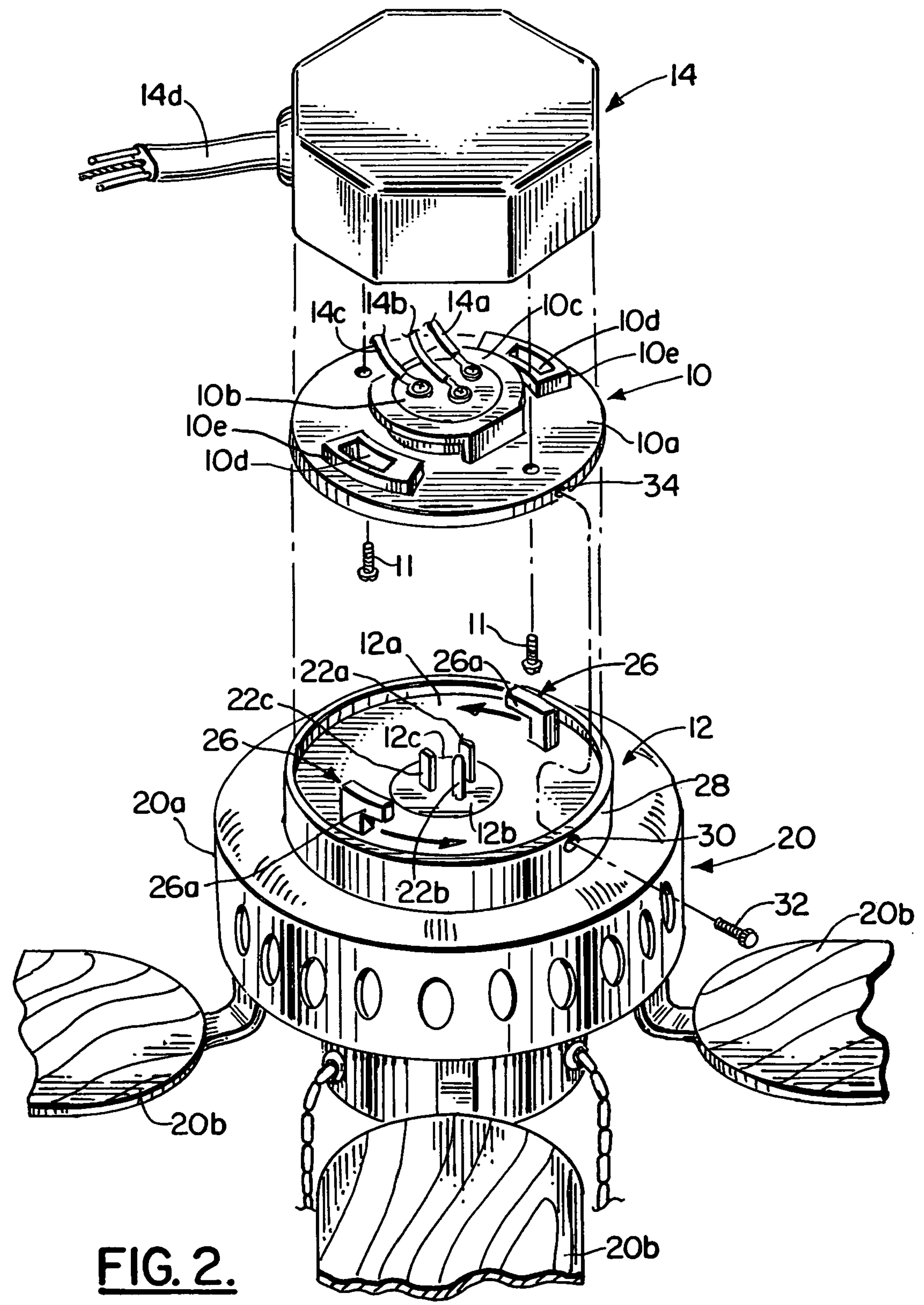
FIG. 2 is a partly cut-away, perspective, exploded view of the invention having a ceiling fan connected thereto.
Figure 3:
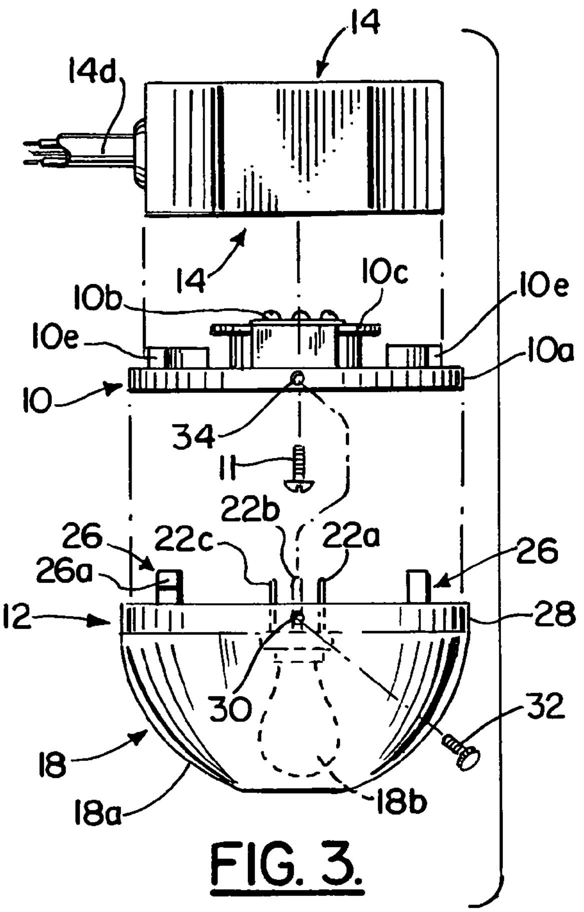
FIG. 3 is a side elevational view of the invention shown in FIG. 1.

Second support member 12 is shown in FIGS. 1, 3, 5 and 6 to have a common light fixture well known in the art generally indicated by the numeral 18 connected thereto, and second support member 12 is shown to have a common ceiling fan 20 well known in the art connected thereto as shown in FIG. 2. Light fixture 18 includes a transparent or translucent globe **18*a* and light bulb 18*b*. Ceiling fan 20 includes motor 20*a* and fan blades 20*b***.

Electrical appliances other than light fixtures 18 or ceiling fans 20 could be attached to second support member 12. Decorative wall lighting fixtures, bathroom heaters, smoke detectors and the like could be used rather than light fixture 18 and fan 20.

Figure 4:
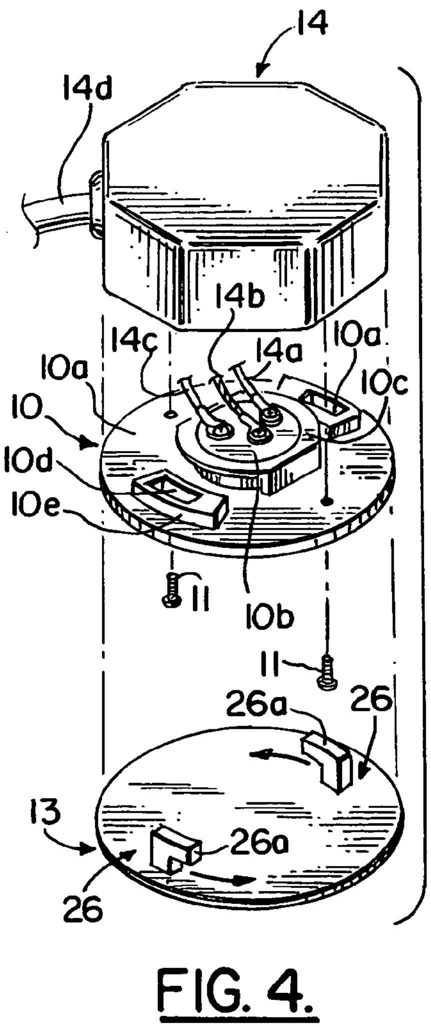
FIG. 4 is a perspective, exploded view of the invention with the light fixture of FIG. 1 replaced with a junction box cover.

In FIG. 4, second support member 12 is shown to be replaced with a cover generally indicated by the numeral 13 aligned for connection to first support member 10 to cover the interior of first support member 10 when no appliance is connected to first support member 10. Cover 13 can be used to esthetically cover first support member 10 when not in use, thereby enabling an electrical appliance having second support member 12 connected thereto to be moved as desired between multiple locations of first support member 10 within a room or building.

First support member 10 includes a rigid circular disc **10*a* having a common female electrical receptacle 10*b* rigidly connected thereto. Electrical receptacle 10*b* is received in shoulder 10*c* and rigidly connected thereto. Shoulder 10*c* is rigidly connected to the top surface of disc 10*a*. Elongated slots 10*d*—10*d* extend completely through disc 10*a* and have raised shoulder 10*e* extending there around. Raised shoulder 10*e* is rigidly connected to the top surface of disc 10*a***.

Figure 5:
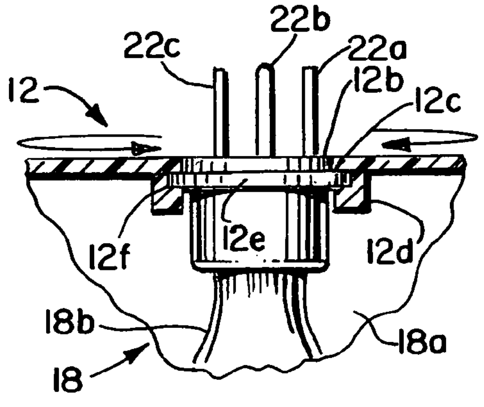
FIG. 5 is a partly cut-away, enlarged view of a portion of the light fixture shown in FIGS. 1 and 3.

Second support member 12 includes a rigid circular disc 12*a* having a male electrical plug 12*b* rotatably connected thereto. As shown in FIG. 5, electrical plug 12*b* is rotatably received in circular bore 12*c* and shoulder 12*d*. Shoulder 12*d* is rigidly connected to lower surface of disc 12*a*. Plug 12*b* has a circular retaining ring 12*e* which is rotatably received in slot 12*f* of shoulder 12*d*. Circular disc 12*a* rotates relative to electrical plug 12*b* as indicated by the arrows in FIGS. 1, 2, and 5.

Extending upward from male electrical plug 12*b* are three male prongs 22*a*, 22*b*, and 22*c*. Male prongs 22*a*, 22*b*, and 22*c* are received in female receptacles 24*a*, 24*b*, and 24*c* in female electrical receptacle 10*b* shown in FIG. 6 to provide electrical energy to appliances connected to circular disc 12*a*, such as light fixture 18 and ceiling fan 20.

Extending upward from disc 12*a* of second support member 12 are two L-shaped connectors generally indicated by the numeral 26—26 rigidly connected thereto. L-shaped connectors 26—26 each have a horizontal shoulder 26*a*—26*a* for supporting disc 12*a* and the electrical appliance such as light fixture 18 or ceiling fan 20 connected thereto.

L-shaped connectors 26—26 are curved and are received in curved elongated slots 10*d*—10*d* of disc 10*a* of first support member 10 so that they may be rotated therein. When L-shaped connectors 26—26 are inserted in elongated slots 10*d*—10*d* of disc 10*a*, they are rotated in the direction indicated by the arrows in FIGS. 1 and 2 to force horizontal shoulders 26*a*—26*a* over the raised shoulder 10*e* extending around elongated slots 10*d*—10*d* to connect second support member 12 to first support member 10. As shown in FIG. 4, cover plate 13 also has L-shaped connectors 26—26 which are received in elongated slots 10*d*—10*d* to connect cover plate 13 to first support member 10.

Second support member 12 has a cylindrical locking ring 28 extending around the outer periphery thereof and upward from the upper surface of disc 12*a*. Locking ring 28 is rigidly connected to disc 12*a* and has a bore 30 therein for receipt of screw fastener 32. First support member 10 has an internally threaded cylindrical bore 34 therein for receipt of screw fastener 32. After L-shaped connectors 26—26 are inserted in elongated slots 10*d*—10*d* of disc 10*a* and are rotated in the direction indicated by the arrows in FIGS. 1 and 2 to force horizontal shoulders 26*a*—26*a* over the raised shoulder 10*e* extending around elongated slots 10*d*—10*d* to connect second support member 12 to first support member 10, bore 34 is aligned with bore 30, and screw fastener 32 is inserted through bore 30 and threaded into internally threaded bore 34 to prevent second support member 12 from rotating relative to first support member 10.

The quick connect junction box assembly of the invention has many applications. The invention may be installed in new homes or offices, or in existing homes and offices. The invention enables an electrical appliance such as a ceiling fan or light fixture to be replaced with a new fixture by simply removing screw 32 and twisting the fixture in a counter-clockwise direction to remove the appliance from first support member 10. For example, a light fixture could be replaced with a ceiling fan, and vice versa utilizing the present invention. If multiple first support members 10 are installed in a single room, an electrical appliance such as a ceiling fan or light fixture could be moved to the various locations of the first support members 10 as desired when adding furniture or rearranging furniture in a room. Furthermore, electrical appliances which need cleaning could be easily removed, cleaned, and replaced. Cover plate 13 could be painted or textured to match the ceiling or wall from which first support member 10 is attached.

I claim:

1. A quick connect junction box assembly for receipt and support of electrical appliances comprising:

a.) a first support member adapted to be attached to a building, said first support member having a female electrical receptacle connected thereto and defining at least one load bearing surface having a slot therein;

b.) a second support member adapted to be attached to and support an electrical appliance and defining at least one load bearing surface, said second support member having a male electrical plug rotatably connected thereto, said male electrical plug being adapted to be received in said female electrical receptacle to make an electrical connection between first support member and said second support member, said second support member having at least one load bearing connector projecting there from toward said first support member, said load bearing connector being adapted to be received in said slot in said load bearing surface in said first support member to connect said second support member to said first support member, said load bearing connector being spaced apart from said male electrical plug.

2. The quick connect junction box assembly of claim 1 wherein said first support member and said second support member are provided with holes for at least one screw to prevent said first support member from rotating relative to said second support member.

3. The quick connect junction box assembly of claim 1 wherein said load bearing connector is L-shaped.

4. The quick connect junction box assembly of claim 3 wherein said L-shaped load bearing connector has a shoulder for contacting said load bearing surface of said first support member to connect said second support member to said first support member.

5. The quick connect junction box assembly of claim 1 wherein said first support member has a disc which is adapted to be connected to an electrical junction box.

6. The quick connect junction box assembly of claim 5 wherein said slot is located in said disc.

7. The quick connect junction box assembly of claim 6 wherein said load bearing surface is a shoulder connected to said disc surrounding said slot.

8. The quick connect junction box assembly of claim 7 wherein said shoulder extends upward from the surface of said disc.

9. The quick connect junction box assembly of claim 5 wherein said female electrical receptacle is connected to said disc.

10. The quick connect junction box assembly of claim 5 wherein said second support member has a disc which is adapted to be connected to said disc of said first support member.

11. The quick connect junction box assembly of claim 10 wherein said connectors are connected to said disc of said second support member.

12. The quick connect junction box assembly of claim 11 wherein said male electrical plug is connected to said disc of said second support member.

* * * * *